(12) United States Patent
Smook et al.

(10) Patent No.: US 12,546,388 B2
(45) Date of Patent: Feb. 10, 2026

(54) TRANSMISSION AND GENERATOR WITH INTERMEDIATE SHAFT

(71) Applicants: ZF FRIEDRICHSHAFEN AG, Friedrichshafen (DE); ZF Wind Power Antwerpen N.V., Lommel (BE)

(72) Inventors: Warren Smook, Huldenberg (BE); Burkhard Lips, Witten (DE); Sven Moers, Westerlo (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/716,949

(22) PCT Filed: Nov. 7, 2022

(86) PCT No.: PCT/EP2022/080958
§ 371 (c)(1),
(2) Date: Jun. 6, 2024

(87) PCT Pub. No.: WO2023/104412
PCT Pub. Date: Jun. 15, 2023

(65) Prior Publication Data
US 2024/0410461 A1    Dec. 12, 2024

(30) Foreign Application Priority Data

Dec. 10, 2021   (DE) ...................... 10 2021 214 132.3

(51) Int. Cl.
*F16H 57/023*   (2012.01)
*F03D 15/00*   (2016.01)
(Continued)

(52) U.S. Cl.
CPC ............ *F16H 57/023* (2013.01); *F16D 1/06* (2013.01); *F16H 57/0037* (2013.01);
(Continued)

(58) Field of Classification Search
CPC ... F16H 2057/02078; F16H 2057/0235; F16H 2057/023; F16D 2001/103; F16D 1/10; F16D 2001/062; F03D 15/00; F03D 80/50
See application file for complete search history.

(56) References Cited

U.S. PATENT DOCUMENTS 8,907,517 B2   12/2014   Mongeau et al.
9,151,275 B2   10/2015   Dinter et al.
(Continued)

FOREIGN PATENT DOCUMENTS

EP   2273112 A2   1/2011
EP   2192299 B1   4/2016

*Primary Examiner* — Jason L Vaughan
(74) *Attorney, Agent, or Firm* — LEYDIG, VOIT & MAYER, LTD.

(57) ABSTRACT

An arrangement, including a gearbox, a generator, an intermediate shaft configured as a hollow shaft which is mounted at least partially in a housing of the gearbox, wherein a rotor of the generator is non-rotatably connected to the intermediate shaft and is supported by the intermediate shaft, and an intermediate piece arranged at least partially in the intermediate shaft. An output shaft of the gearbox is non-rotatably and detachably connected to the intermediate piece. The intermediate piece is non-rotatably and detachably connected to the intermediate shaft.

14 Claims, 4 Drawing Sheets

(51) Int. Cl.
*F16D 1/06* (2006.01)
*F16H 57/00* (2012.01)
*F16H 57/02* (2012.01)
*F16H 57/021* (2012.01)

(52) U.S. Cl.
CPC ........... *F16H 57/021* (2013.01); *F03D 15/00* (2016.05); *F05D 2260/4031* (2013.01); *F16D 2250/0084* (2013.01); *F16D 2300/12* (2013.01); *F16H 2057/02078* (2013.01); *F16H 2057/0235* (2013.01)

(56) References Cited

U.S. PATENT DOCUMENTS

| | | | |
|---|---|---|---|
| 2006/0148612 A1* | 7/2006 | Albers | F03D 15/00 475/331 |
| 2007/0142156 A1* | 6/2007 | Smook | F03D 80/70 475/166 |
| 2009/0058094 A1* | 3/2009 | Jansen | F03D 15/10 290/55 |
| 2011/0068583 A1 | 3/2011 | Burkart | |
| 2011/0293357 A1* | 12/2011 | Riisager | F16D 1/0858 29/446 |
| 2013/0118302 A1* | 5/2013 | Poon | F03D 15/00 74/606 R |
| 2017/0074249 A1 | 3/2017 | Smook | |

\* cited by examiner

TRANSMISSION AND GENERATOR WITH INTERMEDIATE SHAFT

CROSS REFERENCE TO RELATED APPLICATIONS

This application is a U.S. National Phase application under 35 U.S.C. § 371 of International Application No. PCT/EP2022/080958, filed on Nov. 7, 2022, and claims benefit to German Patent Application No. DE 10 2021 214 132.3, filed on Dec. 10, 2021. The International Application was published in German on Jun. 15, 2023 as WO 2023/104412 A1 under PCT Article 21(2).

FIELD

The invention relates to arrangements with a gearbox, a generator, and an intermediate shaft, as well as methods for using such arrangements.

BACKGROUND

EP 2 273 112 A2 discloses a wind power gearbox with an integrated generator. A rotor of the generator is supported by an intermediate shaft which is rotatably mounted in a housing of the gearbox. An output shaft of the gearbox is non-rotatably connected to the intermediate shaft via a spline. As the rotor is supported by the intermediate shaft, it can only be rotated together with the gearbox. For maintenance and assembly purposes, however, it is necessary to rotate the rotor independently of the gearbox.

SUMMARY

In an embodiment, the present disclosure provides an arrangement, comprising a gearbox, a generator, an intermediate shaft configured as a hollow shaft which is mounted at least partially in a housing of the gearbox, wherein a rotor of the generator is non-rotatably connected to the intermediate shaft and is supported by the intermediate shaft, and an intermediate piece arranged at least partially in the intermediate shaft. An output shaft of the gearbox is non-rotatably and detachably connected to the intermediate piece. The intermediate piece is non-rotatably and detachably connected to the intermediate shaft.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
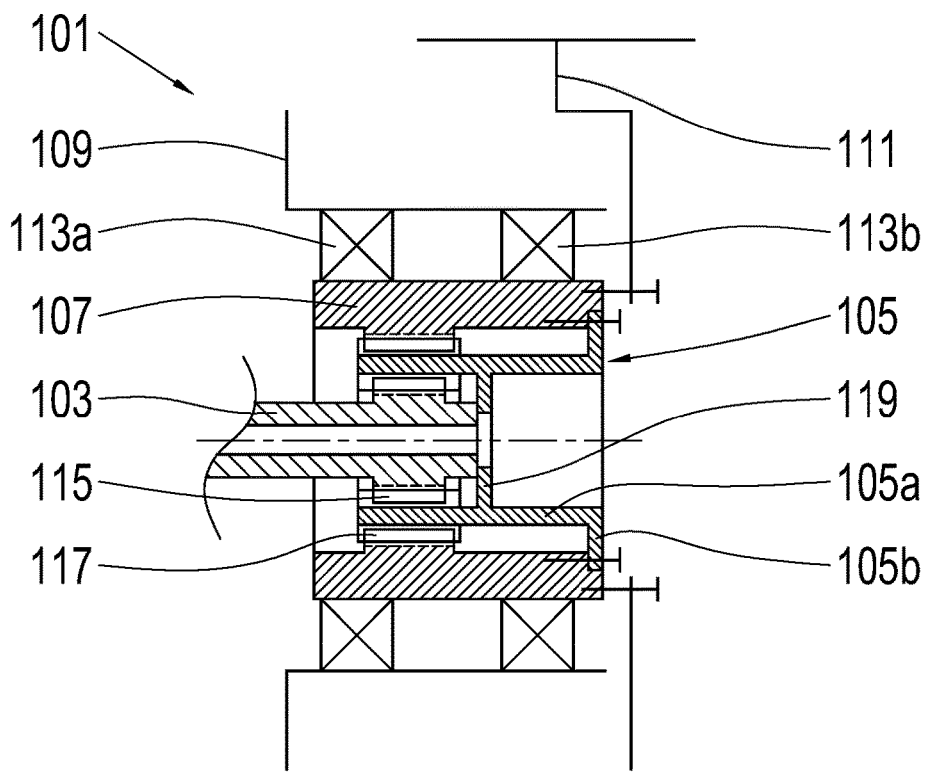
FIG. 1 illustrates a first connection module with an intermediate piece.

In an embodiment, the invention provides for coupling a gearbox and a generator to each other by bypassing the disadvantages inherent in the solutions known from the prior art.

In addition to a gearbox and a generator, the arrangement comprises an intermediate shaft. This is configured as a hollow shaft. A hollow shaft is characterized by a cavity inside the shaft which opens at at least one end wall of the shaft. Preferably, the hollow space opens at both end walls of the shaft. In particular, the hollow shaft can have a hollow cylindrical configuration.

The intermediate shaft is at least partially mounted in a housing of the gearbox. This means that the housing forms at least one bearing seat for a bearing of the intermediate shaft. Preferably, the intermediate shaft is fully mounted in the housing of the gearbox. In this case, all bearings with which the intermediate shaft is mounted are individually located in a bearing seat formed by the housing. The housing then supports the intermediate shaft, i.e. it absorbs all the weight forces acting on the intermediate shaft, in particular the weight of the intermediate shaft.

A rotor of the generator is non-rotatably connected to the intermediate shaft. A non-rotatable connection between two means is characterized by the fact that no rotation of the means about an axis of rotation relative to each other is possible. In particular, torques can be transmitted via the non-rotatable connection.

Furthermore, the rotor is supported by the intermediate shaft. This means that the intermediate shaft absorbs any weight forces acting on the rotor. In particular, the intermediate shaft absorbs the weight of the rotor. This implies that the rotor does not have any bearings of its own, but is mounted exclusively via the bearings of the intermediate shaft.

According to an embodiment of the invention, an intermediate piece is provided which is arranged at least partially, preferably completely, in the intermediate shaft. At least a part of the intermediate piece is thus located in the above-mentioned cavity formed by the intermediate shaft.

The intermediate piece creates a non-rotatable connection between an output shaft of the gearbox and the intermediate shaft. On the one hand, the intermediate piece is non-rotatably connected to the output shaft and, on the other hand, it is non-rotatably connected to the intermediate shaft.

The non-rotatable connections between the intermediate piece and the output shaft and between the intermediate piece and the intermediate shaft are each detachable. By detaching one or both of these connections, the output shaft of the gearbox is decoupled from the intermediate shaft. In this way, the rotor can be rotated together with the intermediate shaft independently of the output shaft for assembly or repair purposes.

In an embodiment, a part of the output shaft is arranged in the intermediate piece. According to this embodiment, the output shaft projects into the intermediate piece. This means that the intermediate piece forms a cavity that contains a part of the output shaft.

The arrangement with the output shaft projecting into the intermediate piece is preferably configured in such a way that the intermediate piece at least partially supports the output shaft. This means that the output shaft is supported in the intermediate piece with at least a part of the weight forces acting on it. The intermediate piece therefore at least partially absorbs the weight forces acting on the output shaft. In particular, it absorbs at least a part of the weight force of the output shaft.

The intermediate shaft is preferably further configured in such a way that it supports the intermediate piece at least partially, preferably completely. This means that the intermediate shaft partially or completely absorbs the weight forces acting on the intermediate piece. If the intermediate piece at least partially supports the output shaft, its weight forces supported in the intermediate piece are introduced into the intermediate shaft so that the intermediate shaft at least partially supports the output shaft.

In an embodiment, the output shaft is non-rotatably connected to the intermediate piece by a first spline. A spline refers to an external toothing and an internal toothing that are arranged coaxially to each other and engage with each other so that both toothings are connected to each other in a non-rotatable manner. In the present case, the output shaft preferably forms the external toothing, while the intermediate shaft forms the internal toothing of the spline.

The arrangement is also preferably configured with a second spline. This connects the intermediate piece to the intermediate shaft in a non-rotatable manner. Preferably, the intermediate piece forms the external toothing of the second spline, while the intermediate shaft forms the internal toothing of the second spline.

The connections of the intermediate piece with the output shaft and/or the intermediate shaft via splines, according to the further embodiment, have the advantage that the intermediate piece can be easily removed. At the same time, high torques can be transmitted via the splines.

In an embodiment, a groove formed in the intermediate shaft serves to axially secure the intermediate piece, wherein the groove extends at least partially in the circumferential direction, i.e. along a circle that extends in a plane orthogonal to an axis of rotation of the intermediate shaft and whose center lies on the axis of rotation. The intermediate piece engages in the groove. At least a part of the intermediate piece is therefore located in the groove. This limits the axial displaceability of the intermediate piece.

In order to be able to mount the intermediate piece in such a way that it engages in the groove of the intermediate shaft, the intermediate shaft is preferably made up of at least two pieces. A first piece and a second piece of the intermediate shaft are detachably connected to each other and joined together along the groove. The first piece and the second piece therefore each form at least one part of the groove.

By detaching the joint connection between the first piece and the second piece, the groove is opened so that the intermediate piece can be inserted. If the first piece and the second piece are now joined together, the intermediate piece engages in the groove as described above.

Instead of the second spline, a screw connection is suitable for connecting the intermediate piece to the intermediate shaft in a non-rotatable manner. In an embodiment, the intermediate piece is screwed to the intermediate shaft.

The first spline can also be replaced by a screw connection. In an embodiment, the intermediate piece is screwed to the output shaft.

A method according to an embodiment of the invention provides for the intermediate piece to be detached from the intermediate shaft and/or from the output shaft. Thus the non-rotatable connection between the intermediate piece and the intermediate shaft and/or the output shaft is detached so that the rotor can be rotated in a further method step.

Due to the non-rotatable connection between the rotor and the intermediate shaft, the rotor rotates together with the intermediate shaft. However, since at least one of the two non-rotatable connections between the intermediate shaft and the intermediate piece and/or between the intermediate piece and the output shaft are detached, the output shaft and the intermediate shaft are decoupled from each other. The intermediate shaft can therefore be rotated with the rotor without the output shaft.

In an embodiment, the intermediate piece, after being detached, is removed from the intermediate shaft and from the output shaft. This simplifies the rotation of the rotor with the intermediate shaft.

The connection modules 101, 301, 401, 501, 601, 701, 801 shown in FIGS. 1 to 8 each comprise an output shaft 103 of a wind turbine gearbox, an intermediate piece 105, an intermediate shaft 107, a housing bell 109 belonging to a housing of the wind turbine gearbox and a rotor 111 of a generator. The intermediate shaft 107 is mounted in the gearbox housing bell 109 via two bearings 113a, 113b. The rotor 111 is screwed onto the intermediate shaft 107. The intermediate piece 105 serves to create a non-rotatable connection between the output shaft 103 and the intermediate shaft 107 and thus between the output shaft 103 and the rotor 111.

The exemplary embodiments shown in FIGS. 1 to 8 differentiate with regard to the configuration of the non-rotatable connection between the output shaft 103 and the intermediate shaft 107. According to FIG. 1, this connection is created by two splines. A first spline 115 is formed by the output shaft 103 and the intermediate piece 105. Together with the intermediate shaft 107, the intermediate piece 105 also forms a second spline 117.

A shoulder 119 runs inside a hollow cylindrical section 105a of the intermediate piece 105. This extends radially inwards from the intermediate piece 105. The output shaft 103 rests against the shoulder 119 and is thus secured against displacement in the axial direction.

An annular section 105b of the intermediate piece 105 is screwed to the intermediate shaft 107. Thus also axial displacements of the intermediate piece 105 and the intermediate shaft 107 relative to each other are prevented.

The screw connection is not used to transmit torques. Output torques of the wind turbine gearbox applied to the output shaft 103 are transmitted instead via the first spline 115 to the intermediate piece and from there via the second spline 117 to the intermediate shaft 107.

Figure 2:
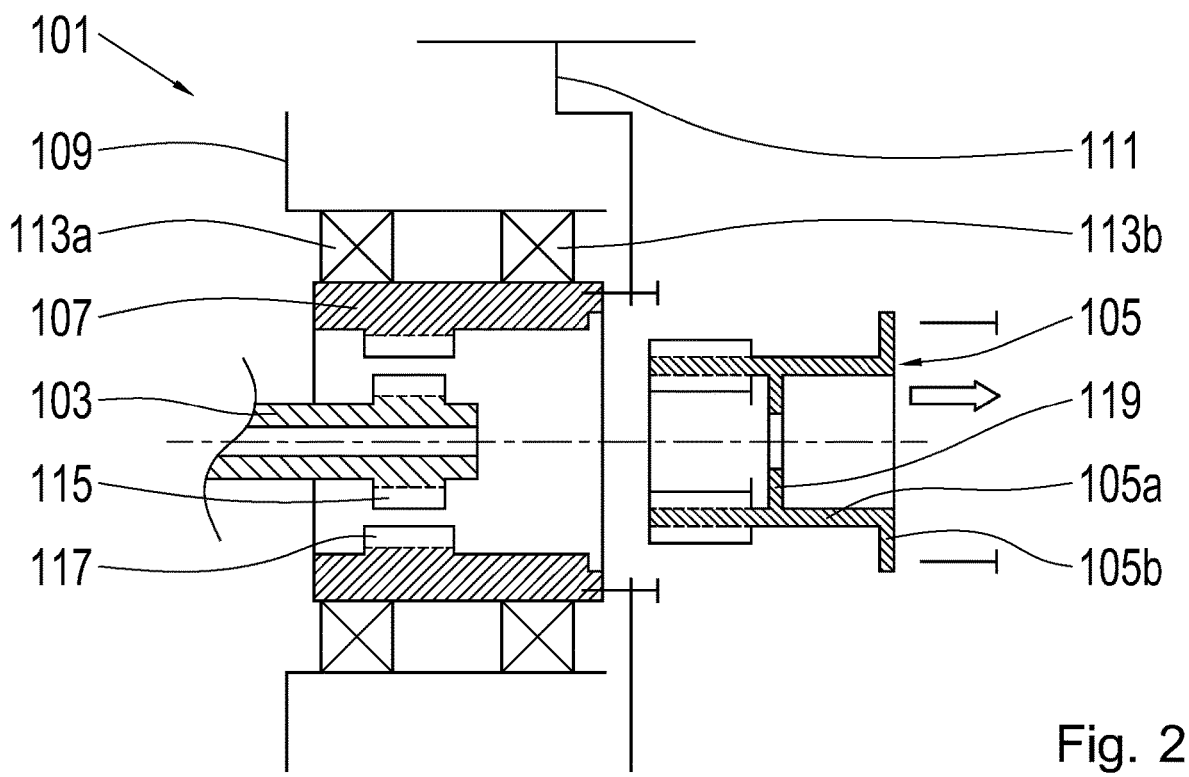
FIG. 2 illustrates the first connection module with the intermediate piece removed.

By detaching the screw connection between the intermediate shaft 107 and the rotor 111, the intermediate piece 105 can be removed in an axial movement towards the generator side. This is shown in FIG. 2.

Figure 3:
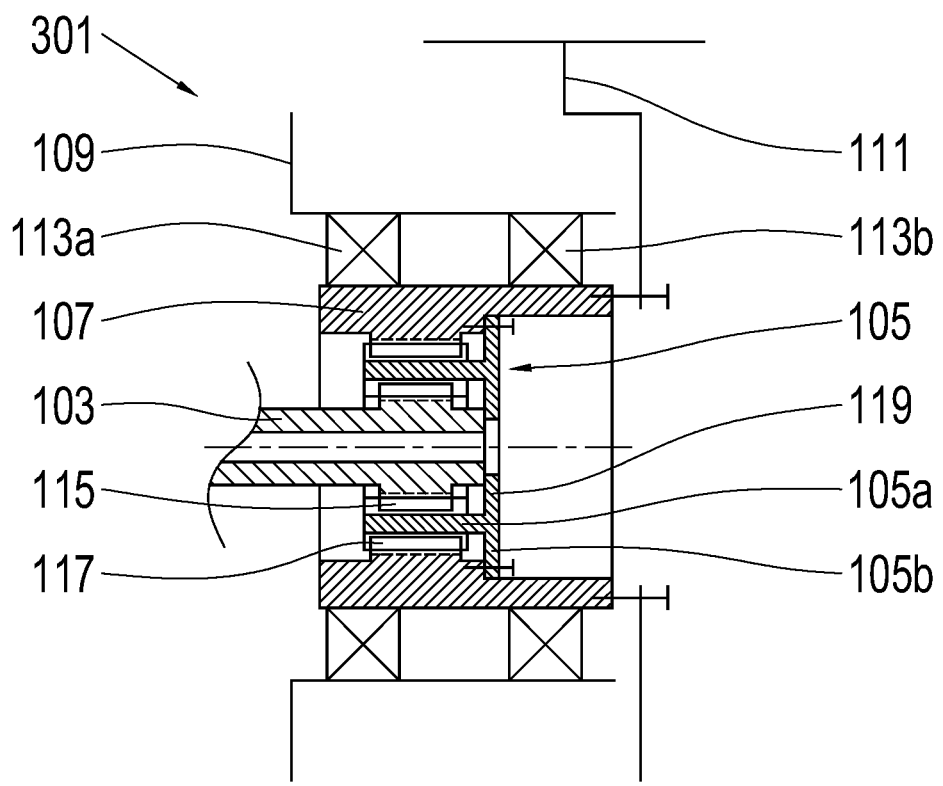
FIG. 3 illustrates a second connection module with an intermediate piece.

FIG. 3 shows a variant of the arrangement from FIG. 1. In FIG. 3, the screw connection of the intermediate piece 105 with the intermediate shaft 107 is arranged further on the gearbox side than in FIG. 1, so that the screw connection is radially aligned with the shoulder 119.

Figure 4:
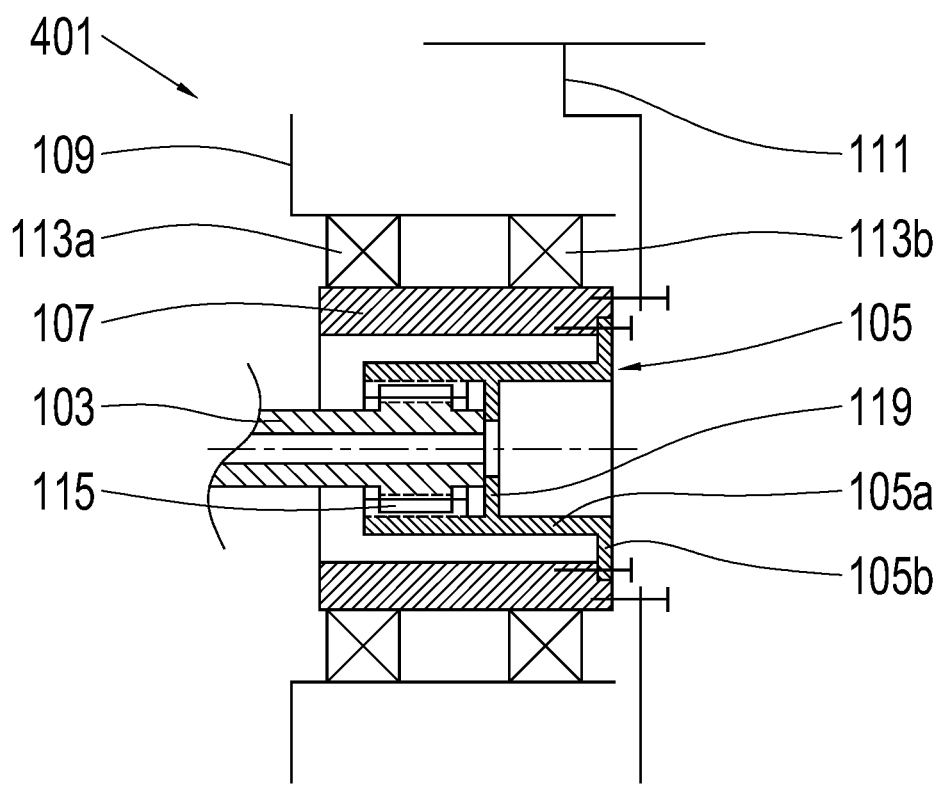
FIG. 4 illustrates a third connection module with an intermediate piece.

The screw connection between the intermediate piece 105 and the intermediate shaft 107 can be used instead of the spline 117 for transmitting torques between the intermediate piece 105 and the intermediate shaft 107. A correspondingly configured third connection module 401 is shown in FIG. 4.

In contrast to the first connection module 101, the third connection module 401 does not have a second spline 117. Instead, the output torques of the wind turbine gearbox are transmitted from the output shaft 103 via the first spline 115 to the intermediate piece 105 and from there via the aforementioned screw connection to the intermediate shaft 107.

Figure 5:
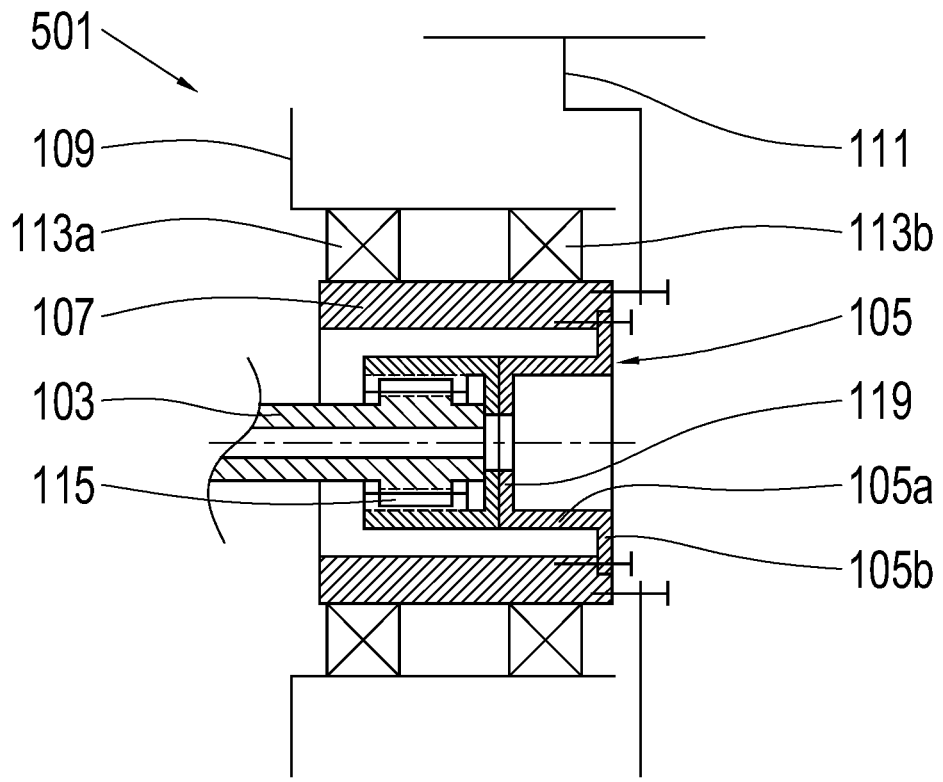
FIG. 5 illustrates a fourth connection module.

FIG. 5 shows a fourth connection module 501. This differs from the first connection module 101 from FIG. 1 in that the intermediate piece 105 is made of two pieces. The two pieces of the connecting module 105 are screwed together along the shoulder 119.

Figure 6:
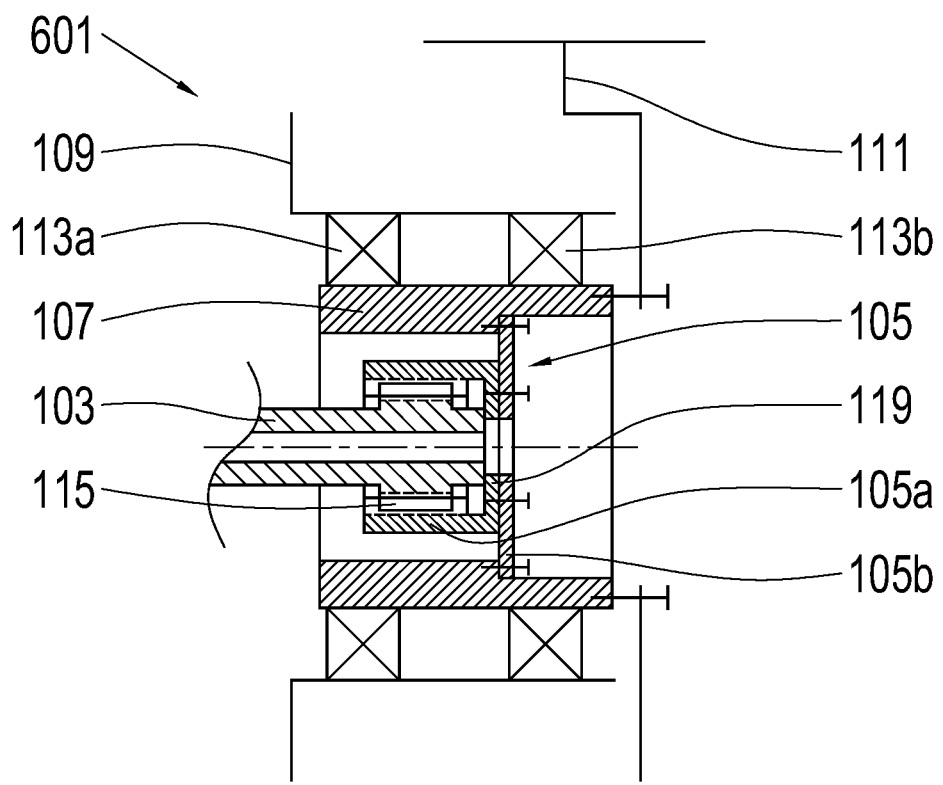
FIG. 6 illustrates a fifth connection module with an intermediate piece.

The connection module 601 shown in FIG. 6 is a variant of the second connection module 301 from FIG. 3. It differs from the second connection module 301 in that it has a two-piece intermediate piece 105, similar to the fourth connection module 501. The two pieces of the intermediate piece 105 are also screwed together here.

Figure 7:
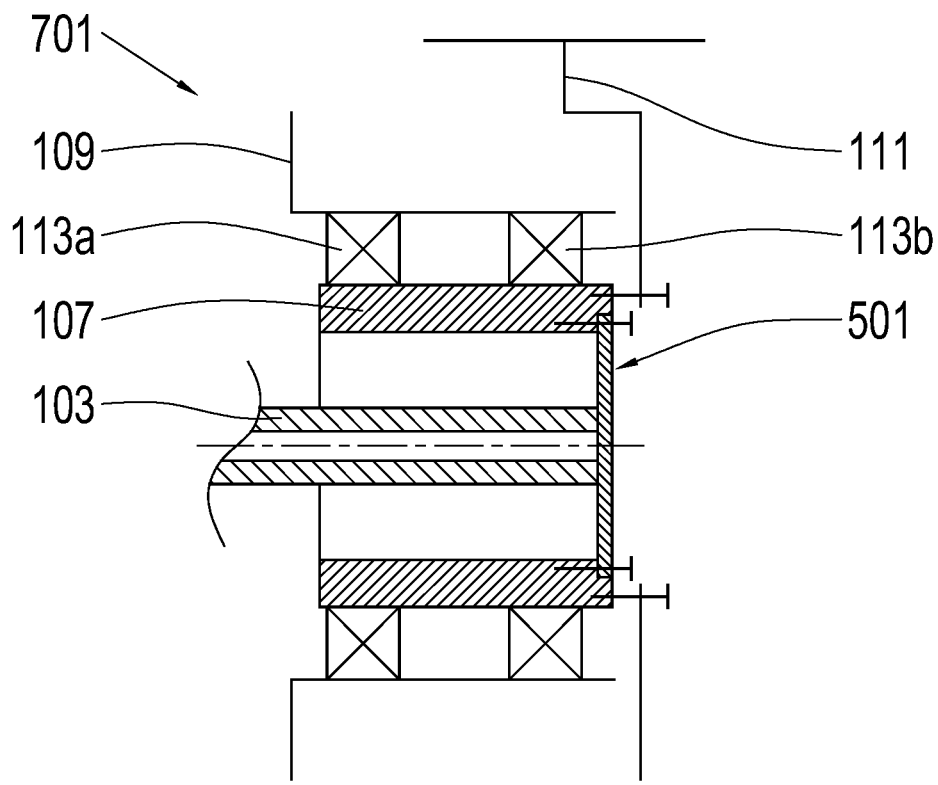
FIG. 7 illustrates a sixth connection module with an intermediate piece.
Figure 8:
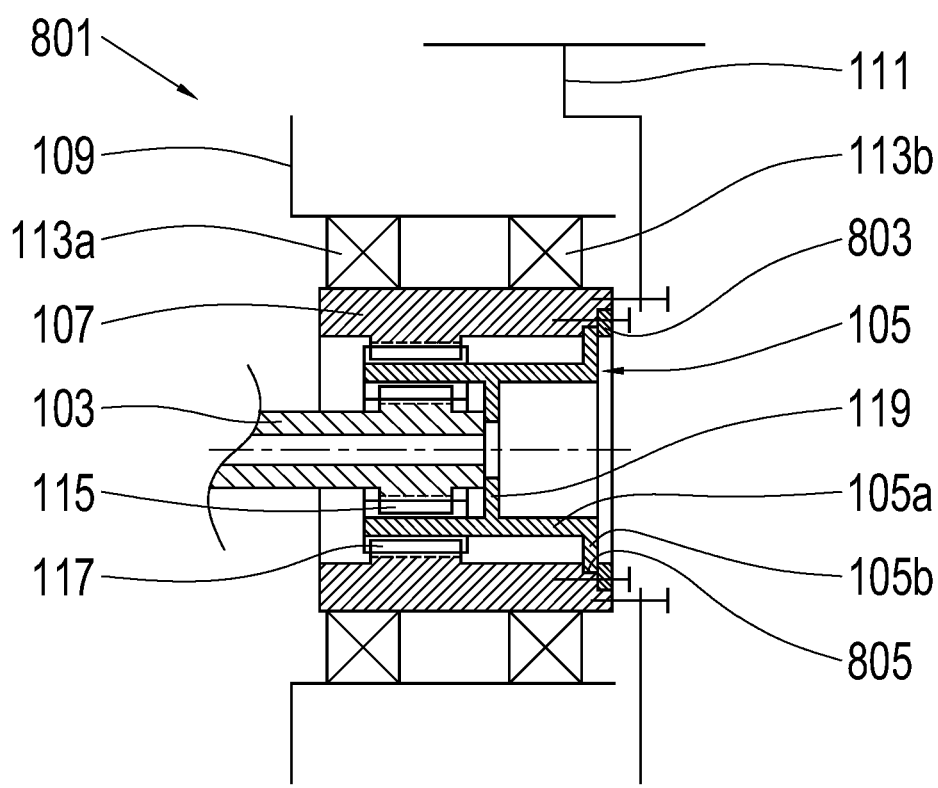
FIG. 8 illustrates a seventh connection module with an intermediate piece.

The sixth connection module 701 shown in FIG. 7 realizes a transmission of the output torque of the wind turbine gearbox from the output shaft 103 via the intermediate piece 105 to the intermediate shaft 107 exclusively in the case of screw connections. Accordingly, the intermediate piece 105 is screwed to both the output shaft 103 and the intermediate shaft 107. Both screw connections are used for torque transmission. Accordingly, the sixth connection module 701 does not have any splines.

The first connection module 101 is statically overdetermined by the second spline 117 and the screw connection of the intermediate piece 105 with the intermediate shaft 107. Therefore, it cannot be ruled out that also the screw connection transmits a torque. As the screw connection is not designed for this, there is a risk of damage. This problem is solved by the seventh connection module 801 shown in FIG. 8. Here an annular shaped plate 803 is screwed to the intermediate shaft 107 instead of the intermediate piece 105.

The plate 803 forms a groove 805 together with the intermediate shaft 107. The intermediate piece 105 engages in this groove 805 and is thus axially fixed. As the intermediate piece 105 can be rotated in the groove 805, all torque is transmitted from the intermediate piece 105 to the intermediate shaft 107 via the second spline 117.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 101 connection module
103 output shaft
105 intermediate piece
105a hollow cylindrical section
105b annular shaped section
107 intermediate shaft
109 gearbox housing bell
111 rotor
113a bearing
113b bearing
115 first spline
117 second spline
119 shoulder
301 connection module
401 connection module
501 connection module
601 connection module
701 connection module
801 connection module
803 plate
805 groove

The invention claimed is:

1. An arrangement, comprising:
a gearbox;
a generator;
an intermediate shaft configured as a hollow shaft which is mounted at least partially in a housing of the gearbox, wherein a rotor of the generator is non-rotatably connected to the intermediate shaft and is supported by the intermediate shaft; and
an intermediate piece arranged at least partially in the intermediate shaft,
wherein an output shaft of the gearbox is non-rotatably and detachably connected to the intermediate piece, and
wherein the intermediate piece is non-rotatably and detachably connected to the intermediate shaft.

2. The arrangement according to claim 1, wherein the output shaft projects into the intermediate piece.

3. The arrangement according to claim 1, wherein the intermediate piece at least partially supports the output shaft.

4. The arrangement according to claim 1, wherein the intermediate shaft at least partially supports the intermediate piece.

5. The arrangement according to claim 1, wherein the output shaft is non-rotatably connected to the intermediate piece by a first spline.

6. The arrangement according to claim 5, wherein the intermediate piece is non-rotatably connected to the intermediate shaft by a second spline.

7. The arrangement according to claim 1, wherein the intermediate shaft has a groove which extends at least partially in the circumferential direction and in which the intermediate piece engages.

8. The arrangement according to claim 7, wherein the intermediate shaft includes a first piece and a second piece which are detachably connected to each other and are joined together along the groove.

9. The arrangement according to claim 1, wherein the intermediate piece is screwed to the intermediate shaft.

10. The arrangement according to claim 9, wherein the intermediate piece is screwed to the output shaft.

11. A method of using the arrangement according to claim 1, the method comprising:
   detaching the intermediate piece from the intermediate shaft and/or from the output shaft; and
   rotating the rotor.

12. The method according to claim 11 further comprising removing the intermediate piece.

13. An arrangement, comprising:
   a gearbox;
   a generator;
   an intermediate shaft configured as a hollow shaft which is mounted at least partially in a housing of the gearbox, wherein a rotor of the generator is non-rotatably connected to the intermediate shaft and is supported by the intermediate shaft; and
   an intermediate piece arranged at least partially in the intermediate shaft,
   wherein an output shaft of the gearbox is non-rotatably and detachably connected to the intermediate piece,
   wherein the intermediate piece is non-rotatably and detachably connected to the intermediate shaft, and
   wherein the rotor is screwed to the intermediate shaft.

14. An arrangement, comprising:
   a gearbox;
   a generator;
   an intermediate shaft configured as a hollow shaft which is mounted at least partially in a housing of the gearbox, wherein a rotor of the generator is non-rotatably connected to the intermediate shaft and is supported by the intermediate shaft; and
   an intermediate piece arranged at least partially in the intermediate shaft,
   wherein an output shaft of the gearbox is non-rotatably and detachably connected to the intermediate piece,
   wherein the intermediate piece is non-rotatably and detachably connected to the intermediate shaft, and
   wherein the intermediate piece is screwed to the output shaft.

* * * * *